(12) United States Patent
Yang

(10) Patent No.: US 11,763,105 B2
(45) Date of Patent: Sep. 19, 2023

(54) MEMORY CARD, MEMORY CARD ADAPTER, AND TERMINAL DEVICE

(71) Applicant: Huawei Technologies Co., Ltd., Shenzhen (CN)

(72) Inventor: Jiangtao Yang, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 125 days.

(21) Appl. No.: 17/286,179

(22) PCT Filed: Oct. 16, 2018

(86) PCT No.: PCT/CN2018/110547
§ 371 (c)(1),
(2) Date: Apr. 16, 2021

(87) PCT Pub. No.: WO2020/077550
PCT Pub. Date: Apr. 23, 2020

(65) Prior Publication Data
US 2021/0390272 A1 Dec. 16, 2021

(51) Int. Cl.
G06K 19/07 (2006.01)
G06K 7/00 (2006.01)
G06K 19/077 (2006.01)

(52) U.S. Cl.
CPC ..... G06K 7/0013 (2013.01); G06K 19/07732 (2013.01)

(58) Field of Classification Search
None
See application file for complete search history.

(56) References Cited

U.S. PATENT DOCUMENTS

| 10,128,910 B2 * | 11/2018 | Peng ............... H04B 5/0037 |
| 2004/0070952 A1 | 4/2004 | Higuchi et al. |
| 2004/0210715 A1 | 10/2004 | Harari et al. |
| 2008/0283602 A1 | 11/2008 | Fagrenius et al. |
| 2009/0002957 A1 | 1/2009 | Mosek et al. |
| 2012/0061459 A1 | 3/2012 | Harari et al. |
| 2012/0193414 A1 | 8/2012 | Thibaudeau |
| 2012/0267276 A1 | 10/2012 | Hunter et al. |

(Continued)

FOREIGN PATENT DOCUMENTS

| CN | 1189985 C | 2/2005 |
| CN | 101068414 A | 11/2007 |

(Continued)

*Primary Examiner* — Thien M Le
*Assistant Examiner* — April A Taylor
(74) *Attorney, Agent, or Firm* — Conley Rose, P.C.

(57) ABSTRACT

A card socket configured for placing a subscriber identification module (SIM) or a memory card includes a first interface, where the first interface is coupled to the SIM or the memory card through a switch. The first interface is further coupled to a first terminal of the switch. A SIM system is coupled to a second terminal of the switch. A memory card system is coupled to a third terminal of the switch. A detection circuit is configured to detect that a card placed in the terminal device is a SIM or a memory card. A control circuit controls the first terminal of the switch to couple to the second terminal of the switch or controls the first terminal of the switch to connect to the third terminal of the switch, based on a detection result of the detection circuit.

14 Claims, 12 Drawing Sheets

(56) References Cited

U.S. PATENT DOCUMENTS

| | | | |
|---|---|---|---|
| 2014/0099805 | A1 | 4/2014 | Kutchery et al. |
| 2015/0079847 | A1 | 3/2015 | Liu et al. |
| 2017/0162982 | A1 | 6/2017 | Wu et al. |
| 2018/0189002 | A1 | 7/2018 | Seo |

FOREIGN PATENT DOCUMENTS

| | | | |
|---|---|---|---|
| CN | 101290663 | A | 10/2008 |
| CN | 101801119 | A | 8/2010 |
| CN | 202135121 | U | 2/2012 |
| CN | 103164737 | A | 6/2013 |
| CN | 104242995 | A | 12/2014 |
| CN | 104702733 | A | 6/2015 |
| CN | 206498198 | U | 9/2017 |
| EP | 1052590 | A1 | 4/2000 |
| JP | 2003324768 | A | 11/2003 |
| JP | 2007208656 | A | 8/2007 |
| JP | 2011192137 | A | 9/2011 |
| JP | 2013501285 | A | 1/2013 |
| JP | 2015522894 | A | 8/2015 |
| KR | 20060031123 | A | 4/2006 |
| KR | 20180077727 | A | 7/2018 |
| RU | 2448412 | C2 | 4/2012 |
| RU | 2627044 | C2 | 8/2017 |
| TW | 200506748 | A | 2/2005 |
| TW | 200923664 | A | 6/2009 |
| TW | 201002038 | A | 1/2010 |
| WO | 0213021 | A2 | 2/2002 |
| WO | 2002013021 | A2 | 2/2002 |

\* cited by examiner

MEMORY CARD, MEMORY CARD ADAPTER, AND TERMINAL DEVICE

CROSS-REFERENCE TO RELATED APPLICATIONS

This application is a U.S. National Stage of International Patent Application No. PCT/CN2018/110547 filed on Oct. 16, 2018, which is hereby incorporated by reference in its entirety.

TECHNICAL FIELD

Embodiments of the present invention relate to the field of communications technologies, and in particular, to a memory card, a memory card adapter, and a terminal device.

BACKGROUND

With continuous development of technologies and constant growth of people's living needs, functions of terminal devices are increasing while their sizes have not changed much in order to adapt to the physiology of human bodies. As a result, space in a terminal device becomes extremely precious. Particularly, in users' pursuits of a large-screen and full-screen terminal device, space in a terminal device for placing various functional modules is further compressed. Therefore, it is particularly important to improve space utilization of a terminal device.

At present, many terminal devices are configured with dual subscriber identification modules (subscriber identification module, SIM), but on the market, many people use only one SIM, leaving the other card socket basically vacant. How to more effectively utilize the other card socket has become a technical issue that needs to be resolved urgently by persons skilled in the art.

SUMMARY

Embodiments of this application provide a memory card, a memory card adapter, and a terminal device. In some embodiments of this application, a card socket in a terminal device can be effectively utilized, to improve space utilization of the terminal device.

According to a first aspect, this application provides a terminal device. The terminal device includes: a card socket, a SIM module, a memory card module, a switch, a detection circuit, and a control circuit. The card socket is configured for placing a SIM or a memory card, and the card socket includes a first interface, where the first interface is connected to the SIM or the memory card through the switch. The first interface is connected to a first terminal of the switch. The SIM module is connected to a second terminal of the switch. The memory card module is connected to a third terminal of the switch. The detection circuit is configured to detect that a card placed in the terminal device is a SIM or a memory card. The control circuit controls the first terminal of the switch to connect to the second terminal of the switch or controls the first terminal of the switch to connect to the third terminal of the switch, based on a detection result of the detection circuit. In this embodiment of this application, the card socket of the terminal device can be configured for placing either a SIM card or a memory card, thereby improving space utilization of the terminal device. Especially for those terminal devices supporting multiple cards, space utilization of card interfaces can be improved, thereby improving user experience.

In one possible implementation, an outline and a size of the SIM are the same as those of the memory card. In this embodiment of this application, the SIM and the memory card can share interface resources of the terminal device through the switch, improving resource utilization of the terminal device.

In another possible implementation, the SIM may be a nano SIM (referred to as a fourth form factor integrated circuit board). Based on this, the SIM module includes at least a SIM data interface, a SIM reset interface, and a SIM clock interface. The memory card module includes at least a memory card first data interface, a memory card second data interface, and a memory card clock interface. The SIM data interface is connected to a second terminal of a first switch, and the memory card first data interface is connected to a third terminal of the first switch. The SIM reset interface is connected to a second terminal of a second switch, and the memory card second data interface is connected to a third terminal of the second switch. The SIM clock interface is connected to a second terminal of a third switch, and the memory card clock interface is connected to a third terminal of the third switch. The first terminal of the first switch is connected to a first terminal of the first interface, the first terminal of the second switch is connected to a second terminal of the first interface, and the first terminal of the third switch is connected to a third terminal of the third switch.

In another possible implementation, that the detection circuit is configured to detect that a card placed in the terminal device is a SIM or a memory card, includes:

when there is a card placed in the terminal device, the control circuit sends a first command to the card, and the detection circuit detects, based on a response of the card to the first command, that the card is the memory card or the SIM.

In another possible implementation, the foregoing terminal device further includes a power source, where when there is a card placed in the terminal device, a voltage of the power source is set to a first voltage; and when the detection circuit detects that the card is the memory card or the SIM, the voltage of the power source is set to a voltage corresponding to the memory card or the SIM.

According to a second aspect, this application provides a SIM. An outline and a size of the SIM are the same as those of a memory card, a position of a power interface of the SIM corresponds to that of a power interface of the memory card, and a position of a ground interface of the SIM corresponds to that of a ground interface of the memory card. The SIM provided in this embodiment of this application can share a card socket of a terminal device with the memory card that has the same outline and size as the SIM, thereby improving resource utilization of the terminal device.

In one possible implementation, the memory card is a micro secure digital memory (micro secure digital memory, Micro SD) card. The SIM module includes at least a SIM data interface, a SIM reset interface, and a SIM clock interface. The memory card module includes at least a memory card first data interface, a memory card second data interface, and a memory card clock interface. A position of the SIM data interface corresponds to that of the memory card first data interface; a position of the SIM reset interface corresponds to that of the memory card second data interface; and a position of the SIM clock interface corresponds to that of the memory card clock interface.

According to a third aspect, this application provides a memory card. An outline and a size of the memory card are the same as those of a SIM, a position of a power interface of the SIM corresponds to that of a power interface of the memory card, and a position of a ground interface of the SIM corresponds to that of a ground interface of the memory card. The memory card provided in this embodiment of this application can share a card socket of a terminal device with the SIM that has the same outline and size as the memory card, thereby improving resource utilization of the terminal device.

In one optional implementation, the foregoing SIM is a nano SIM. The SIM module includes at least a SIM data interface, a SIM reset interface, and a SIM clock interface. The memory card module includes at least a memory card first data interface, a memory card second data interface, and a memory card clock interface. A position of the SIM data interface corresponds to that of the memory card first data interface; a position of the SIM reset interface corresponds to that of the memory card second data interface; and a position of the SIM clock interface corresponds to that of the memory card clock interface.

According to a fourth aspect, this application provides a memory card adapter, including: a housing portion, corresponding to a memory card socket of a first standard. The housing portion includes: a card socket, where the card socket is configured for placing a memory card of a second standard, an outline and a size of the memory card of the second standard are the same as those of a nano SIM, and at least one interface position of the memory card of the second standard corresponds to an interface position of the nano SIM; and a converter circuit, where the converter circuit is configured to convert an interface of the memory card of the second standard to an interface of a memory card of a first standard. The memory card adapter can convert a memory card, whose outline and size and some interface positions correspond to those of a nano SIM, to a memory card of another standard.

In one optional implementation, an operating level of the memory card of the first standard differs from that of the memory card of the second standard, and the converter circuit includes a level converter circuit and a transformer circuit, where the level converter circuit is configured to perform conversion between an operating level for the interface of the memory card of the first standard and that for the interface of the second standard, during communication, and the transformer circuit is configured to power the level converter circuit.

In one optional implementation, the memory card of the first standard includes a plurality of operating levels, and the memory card adapter further includes a switch, where the switch is configured to control the operating level of the memory card adapter.

In one optional implementation, the switch is placed between the converter circuit and a memory card interface of the first standard in the housing portion.

According to a fifth aspect, this application provides a card recognition method. Initialization modes are pre-configured for a plurality of communication protocols, and the method includes: initializing a card using the initialization modes pre-configured for the plurality of communication protocols, in ascending order of IO operating levels and power supply voltages; and if the card is initialized successfully using an initialization mode pre-configured for a first communication protocol, controlling the card based on the first communication protocol. In this embodiment of this application, a type of a card placed in a card socket can be recognized by traversing initialization processes.

In one optional implementation, the plurality of communication protocols include one or more of: a SIM communication protocol with an IO operating level and a power supply voltage both being 1.8 V, a memory card communication protocol with an IO operating level of 1.8 V and a power supply voltage of 3 V, a memory card communication protocol with an IO operating level and a power supply voltage both being 3 V, and a SIM communication protocol with an IO operating level and a power supply voltage both being 3 V.

According to a sixth aspect, this application provides a card recognition method. The method is applicable to a terminal device. The terminal device includes a card socket, where the card socket includes the plurality of terminals. The method includes: detecting a first operating state of at least one of a plurality of terminals of the interface of the card socket, where operating states of the at least one of the plurality of terminals of the interface are in a correspondence with communication protocols; and controlling a card based on a communication protocol corresponding to the first operating state. In this embodiment of this application, an operating state of an interface of the card socket is detected, so as to recognize a type of an external card placed in the card socket based on differences between operating states of terminals for different types of cards.

In one optional implementation, the plurality of terminals include at least one terminal that is to be configured to connect only to a memory card.

In another optional implementation, the correspondence between operating states of the at least one of the plurality of terminals of the interface and communication protocols includes: that the terminal configured to connect only to a memory card, when in a communicated state, corresponds to a memory card communication protocol; and that the terminal configured to connect only to a memory card, when in a shorted state, corresponds to a SIM communication protocol.

In another optional implementation, the memory card communication protocol includes micro SD card communication protocol, and the SIM communication protocol includes a nano SIM communication protocol.

According to a seventh aspect, this application provides a card recognition method. The method is applicable to a terminal device, and the method includes:

sending a command to a card using a first voltage; and if a response sent by the card is received, initializing the card as a memory card.

In one optional implementation, the initializing the card as a memory card includes initializing the card as a memory card of a first level standard. The method further includes: if the card is initialized unsuccessfully as a memory card of a first level standard, initializing the card as a SIM.

In one optional implementation, the method further includes: if no response sent by the card is received, initializing the card as a SIM.

In one optional implementation, the method further includes: if the card is unsuccessfully initialized as a SIM, initializing the card as a memory card of a second level standard.

According to an eighth aspect, this application provides a terminal device. The terminal device includes an IO subsystem, a processor, and a memory, where the memory is configured to store a program, the IO subsystem is configured to interact with a card, and the processor is configured to execute the program stored in the memory, to control the terminal device to perform the method according to any one or more aspects of the fifth aspect, the sixth aspect, and the seventh aspect.

According to a ninth aspect, this application provides a computer readable storage medium, where the computer readable storage medium stores a computer program. When the computer program is executed by a processor, the method according to any one or more aspects of the fifth aspect, the sixth aspect, and the seventh aspect is implemented.

According to a tenth aspect, this application provides a computer program product that includes an instruction. When the instruction is run on a computer, the computer is enabled to perform the method according to any one or more aspects of the fifth aspect, the sixth aspect, and the seventh aspect.

According to an eleventh aspect, this application provides a chip, including: a processor and a memory, where the memory is configured to store a program, and the processor is configured to execute the program stored in the memory, to perform the method according to any one or more aspects of the fifth aspect, the sixth aspect, and the seventh aspect.

DETAILED DESCRIPTION

The technical solutions of this application are further described in detail with reference to the accompanying drawings and embodiments as follows.

In the embodiments of this application, although "first", "second", "third", and the like may be used herein to describe various elements, components, regions, layers and/or portions, these elements, components, regions, layers, and/or portions are not limited by these terms. These terms are used only to distinguish one element, component, region, layer, or portion from another region, layer, or portion. Therefore, a first element, component, region, layer or portion discussed below can be referred to as a second element, component, region, layer or section without departing from the teaching of the inventive concept of the present invention.

Analysis finds that many terminal devices are configured with dual or even more SIMs, but on the market, many people use only one SIM, leaving the other card socket basically vacant, whereas it is a huge market for users to expand storage or move data of terminal devices using external memory cards. Based on this, in a solution provided in the embodiments of this application, one or more card sockets in a terminal device may be designed to support both a SIM and a memory card, thereby utilizing the card sockets in the terminal device efficiently, and improving space utilization of the terminal device.

Figure 1:
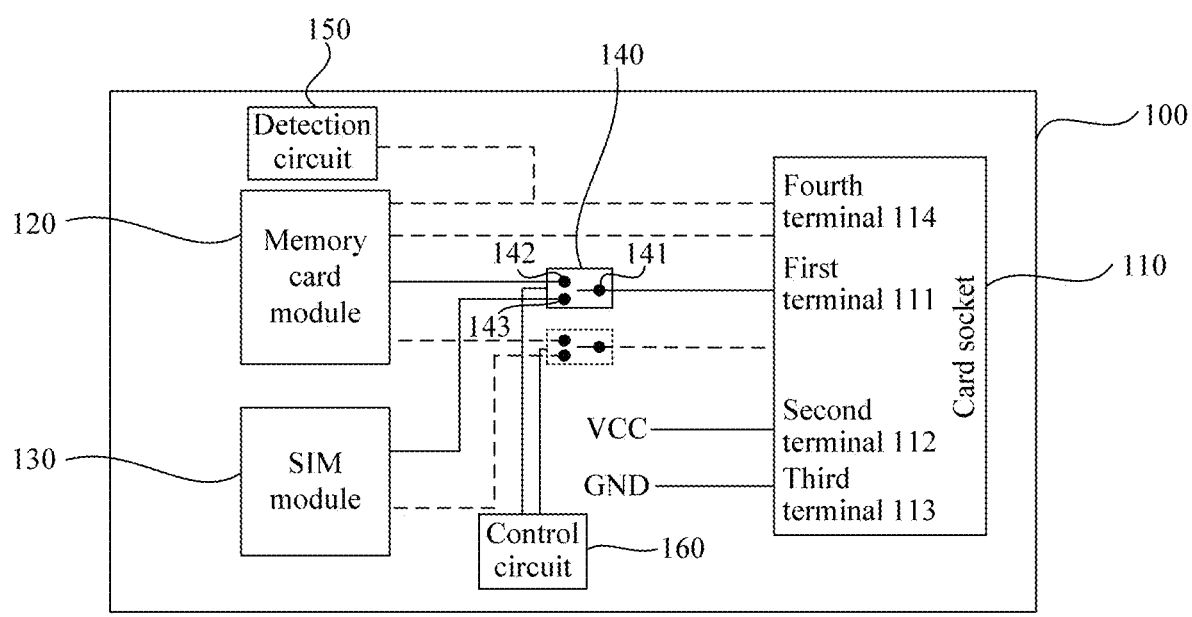
FIG. 1 is a schematic structural diagram of a terminal device according to an embodiment of the present invention.

FIG. 1 is a schematic structural diagram of a terminal device according to an embodiment of this application. As shown in FIG. 1, the terminal device 100 may particularly include a card socket 110, a SIM module 130, a memory card module 120, n switches 140, a detection circuit 150, and a control circuit 160, where n is a positive integer.

The card socket 110 is configured for placing a SIM and a memory card. The terminal device 100 may be configured to accommodate two or more cards, and the card may be a SIM or a memory card. In particular, this may be implemented in a plurality of manners. For example, the terminal device 100 may be provided with two or more card sockets, and interfaces of the two or more card sockets may be partially or completely configured as an interface structure of the card socket 110 shown in FIG. 1, and each card socket 110 may be configured for placing one SIM or one memory card. For another example, the card socket 110 of the terminal device 100 may include two or more interfaces, where the two or more interfaces may be partially or completely configured as an interface structure of the card socket 110 shown in FIG. 1, and each interface may be configured for placing one SIM or one memory card.

The card socket 110 includes a first interface, where the first interface is connected to a SIM or a memory card through a switch. For example, the switch may be a two-way multiplexer switch.

The first interface is connected to a first terminal of the switch.

The SIM module is connected to a second terminal of the switch.

The memory card module is connected to a third terminal of the switch.

The detection circuit 150 is configured to detect that a card placed in the terminal device is a SIM or a memory card.

The control circuit 160 controls the first terminal of the switch to connect to the second terminal of the switch or controls the first terminal of the switch to connect to the third terminal of the switch, based on a detection result of the detection circuit.

With reference to FIG. 1, the first interface of the card socket 110 includes a plurality of terminals, for example, a first terminal 111, a second terminal 112, a third terminal 113, and a fourth terminal 114 shown in FIG. 1. The card socket 110 is connected to an interface of the SIM or the memory card placed in the card socket 110 through the plurality of terminals of the first interface, so that the terminal device 100 controls the SIM or the memory card.

Using the first terminal 111 of the first interface as an example, the first terminal 111 is connected to a movable terminal 141 of the two-way multiplexer switch (that is, the first terminal of the switch), an immovable terminal 142 of the two-way multiplexer switch (that is, the third terminal of the switch) is connected to the memory card module 120, and an immovable terminal 143 of the two-way multiplexer switch (that is, the second terminal of the switch) is connected to the SIM module.

In some embodiments, the first interface of the card socket 110 further includes a terminal that is directly connected to the SIM or the memory card. For example, a VPP interface of the SIM is a programming interface, which is often not used during use of the SIM. Therefore, an interface of the card socket that corresponds to the VPP interface may be connected not to the SIM module, and the interface of the card socket that corresponds to the VPP interface may be directly connected to the memory card.

In some embodiments, the first interface of the card socket 110 further includes a terminal that is shared without the switch. For example, a power domain of a power source (volt current condenser, VCC) of the SIM and the memory card is 1.8 V to 3.3 V. Therefore, the SIM and the memory card may share a power source VCC and a ground (ground, GND). Based on this, terminals of the first interface of the card socket 110 that correspond to a power interface and a ground interface may share a power source VCC and a ground (ground, GND).

Figure 2:
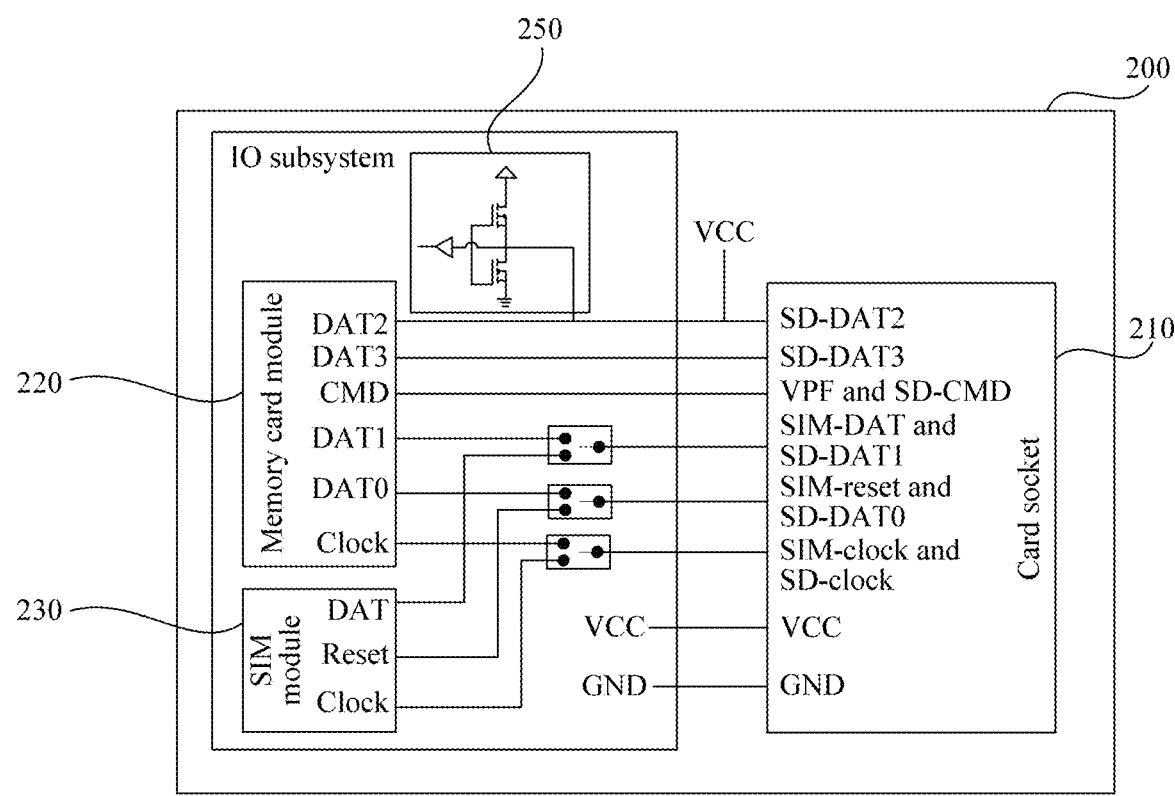
FIG. 2 is a schematic structural diagram of another terminal device according to an embodiment of the present invention.

For example, with reference to FIG. 2, the memory card may include 8 interfaces: a data (data, DAT) 3 interface, a command (command, CMD) interface, a clock (clock, CLK) interface, a DAT0 interface, a DAT1 interface, a DAT2 interface, a VCC interface, and a GND interface. Specifics are described in Table 1 below.

TABLE 1

| Interface | Name | Type | Description |
|---|---|---|---|
| 1 | CD/DAT3 | I/O | Data |
| 2 | CMD | I/O | Command or request |
| 3 | CLK | I | Clock |
| 4 | DAT0 | I/O | Data |
| 5 | DAT1 | I/O | Data |
| 6 | DAT2 | I/O | Data |
| 7 | VCC | S | Power source |
| 8 | GND | S | Ground |

A nano SIM may include 6 interfaces: a programming voltage (programming voltage, VPP) interface, a CLK interface, a DAT, a reset (reset, RST) interface, a VCC interface and a GND interface. Specifics are described in Table 2 below.

TABLE 2

| Nano SIM | | | |
|---|---|---|---|
| Interface | Name | Type | Description |
| 1 | VPP | S/I | Programming voltage/Input signal |
| 2 | CLK | I | Clock |
| 3 | DAT | I/O | Data |
| 4 | RST | I | Reset |
| 5 | VCC | S | Power source |
| 6 | GND | S | Ground |

Based on this, the foregoing SIM card includes at least a SIM DAT interface, a SIM reset interface, and a SIM clock interface; the foregoing memory card includes at least a memory card first data interface (for example, DAT0), a memory card second data interface (for example, DAT1), and a memory card clock interface. Types of interfaces that are connected to one two-way multiplexer switch may be made identical as much as possible. For example, SIM DAT and the memory card first data interface (for example, DAT0) are connected to one two-way multiplexer switch; the SIM reset interface and the memory card second data interface (for example, DAT1) are connected to one two-way multiplexer switch; and the SIM clock interface and the memory card clock interface are connected to one two-way multiplexer switch. In this way, interfaces of a same data type can be controlled using one switch, reducing a possibility of failure. The SIM card and the memory card may further include a power interface and a ground interface. The memory card may further include a CMD interface (a position of the interface is the same as that of the VPP interface of the SIM), a memory card third data interface (for example, DAT2), and a memory card fourth data interface (for example, DAT3). The SIM may further include a VPP interface. Based on this, as shown in FIG. 2, an interface of the card socket 210 of the terminal device 200 may include at least the following terminals:

an SD-DAT2 interface terminal that is directly connected to the DAT2 interface of the memory card module 220;

an SD-DAT3 interface terminal that is directly connected to the DAT3 interface of the memory card module 220;

a VPF and SD-CMD interface terminal that is directly connected to the CMD interface of the memory card module 220;

a SIM reset and SD-DAT0 interface terminal that is connected to a reset interface of the SIM module and a DAT0 interface of a storage controller through one two-way multiplexer switch;

a SIM clock and SD-clock interface terminal that is connected to a clock interface of the SIM module and a clock interface of the storage controller through one two-way multiplexer switch;

a VCC interface terminal that is connected to a power source of the IO sub-system; and a GND interface terminal that is connected to a ground of the IO sub-system.

In some embodiments, that the detection circuit is configured to detect that a card placed in the terminal device is a SIM or a memory card specifically, includes: when there is a card placed in the terminal device, the control circuit sends a first command to the card, and the detection circuit detects, based on a response of the card to the first command, the card is a memory card or a SIM. For example, interface quantities of the SIM and the memory card are different. The first interface of the card socket 110 may include a terminal that corresponds only to an interface of the SIM or the memory card, for example, the SD-DAT2 interface terminal or the SD-DAT3 interface terminal shown in FIG. 2. Based on this, the detection circuit 150 of the terminal device is configured to detect an operating state of any one or more of the terminals included by the first interface of the card socket 110 that correspond only to an interface of the SIM or the memory card. The memory card and the SIM have the same outline and size, but have different interface quantities. After different cards are inserted in the card socket, types of the cards are recognized by the detection circuit 150 based on whether different terminals of the card socket are shorted. For example, with reference to FIG. 2, the detection circuit 250 may be configured to detect a level of the SD-DAT2 interface, and determine that the inserted card is a memory card or a SIM, based on the detected level of the SD-DAT2 interface. In addition, alternatively, the detection circuit 150 may detect operating states of other terminals of the first interface of the card socket 110, or all terminals of the first interface of the card socket 110, so as to detect that the card placed in the terminal device is a SIM or a memory card. For specific information, refer to the embodiments shown in FIG. 9 to FIG. 12. Details are not described herein.

In some embodiments, the SIM and the memory card may be placed at one interface of a same card socket 110. For example, the SIM and the memory card may be designed with a same outline and size, with positions of some interfaces in correspondence. The outline may be standardized by an outline of a SIM. For example, the SIM and the memory card are configured in compliance with the nano SIM standard. Alternatively, the outline may be standardized by an outline of a memory card. For example, the SIM and the memory card are configured in compliance with the micro SD card standard. Alternatively, a dedicated standard may be determined, and the SIM and the memory are configured in compliance with this dedicated standard. For specific structures of the SIM and the memory card, refer to the descriptions of the embodiments shown in FIG. 3, FIG. 4, and FIG. 5. Details are not described herein.

In some embodiments, the terminal device further includes a power source. When there is a card placed in the terminal device, a voltage of the power source is set to a first voltage; and when the detection circuit detects that the card is a memory card or a SIM, the voltage of the power source is set to a voltage that is corresponding to the memory card or the SIM. For specific information, refer to the embodiment shown in FIG. 11 or FIG. 12. Details are not described herein.

Figure 3:
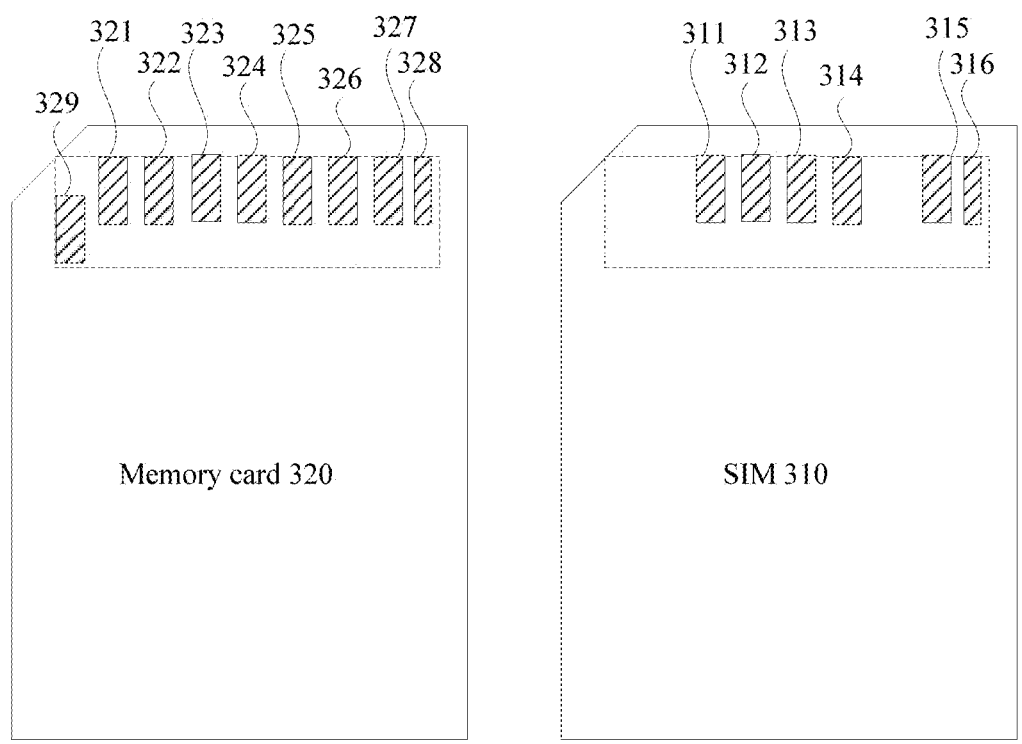
FIG. 3 is a schematic structural diagram of a SIM according to an embodiment of the present invention.

FIG. 3 is a schematic structural diagram of a SIM further according to an embodiment of this application. With reference to FIG. 3, the SIM is configured to be placed in the card socket shown in FIG. 1 or FIG. 2. As shown in FIG. 3, an outline and a size of the SIM 310 are the same as those of a memory card 320, and positions of n first interfaces (for example, an interface 311, an interface 312, an interface 313, an interface 314, an interface 315, and an interface 316) of the SIM correspond to positions of n second interfaces (for example, an interface 323, an interface 324, an interface 325, an interface 326, an interface 328, and an interface 329) of the memory card, where the first interfaces include a power interface and a ground interface of the SIM, and the second interfaces include a power interface and a ground interface of the memory card, where n is a positive integer.

Using that the memory card is a micro SD as an example, an outline and a size of the SIM 310 may be the same as those of a micro SD card 320. Based on this, the foregoing SIM module includes at least a SIM data interface, a SIM reset interface, and a SIM clock interface; and the memory card module includes at least a memory card first data interface, a memory card second data interface, and a memory card clock interface; where a position of the SIM data interface corresponds to that of the memory card first data interface; a position of the SIM reset interface corresponds to that of the memory card second data interface; and a position of the SIM clock interface corresponds to that of the memory card clock interface. For example, with reference to FIG. 3, interfaces of the micro SD card 320 include: a DAT3 interface 321, a CMD interface 322, a ground interface 323, a power interface 324, a CLK interface 325, a ground interface 326, a DAT0 interface 327, a DAT1 interface 328, and a DAT2 interface 329. Corresponding interfaces of the SIM 310 include: a VPP interface 311 corresponding to the CMD interface 322, a ground interface 312 corresponding to the ground interface 323, a power interface 313 corresponding to the power interface 324, a CLK interface 314 corresponding to the CLK interface 325, a reset interface 315 corresponding to the DAT0 interface 327, and a DAT interface 316 corresponding to the DAT1 interface 328.

Figure 4:
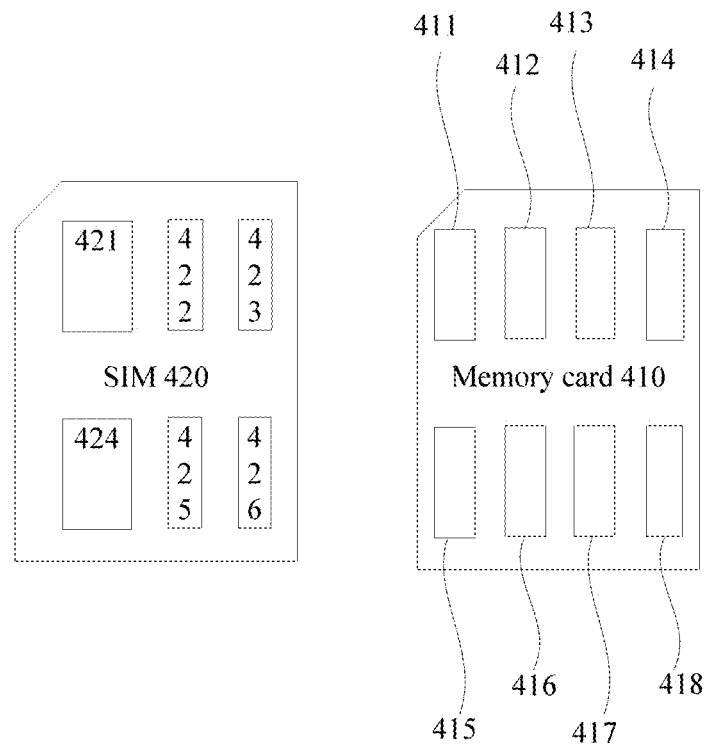
FIG. 4 is a schematic structural diagram of a memory card according to an embodiment of the present invention.

FIG. 4 is a schematic structural diagram of a memory card further according to an embodiment of this application. With reference to FIG. 4, the memory card is configured to be placed in the card socket shown in FIG. 1 or FIG. 2. As shown in FIG. 4, an outline and a size of the memory card are the same as those of a SIM, and positions of n first interfaces (for example, an interface 421, an interface 422, an interface 423, an interface 424, an interface 425, and an interface 426) of the SIM correspond to positions of n second interfaces (for example, an interface 412, an interface 413, an interface 414, an interface 416, an interface 417, and an interface 418) of the memory card, where the first interfaces include a power interface and a ground interface of the SIM, and the second interfaces include a power interface and a ground interface of the memory card, where n is a positive integer. In addition, with reference to FIG. 4, the memory card may further include m third interfaces (for example, an interface 411 and an interface 415), where there are no interfaces on the SIM that have the same positions as the m third interfaces.

The outline and the size of the memory card may be the same as those of a nano SIM. Based on this, the foregoing SIM module includes at least a SIM data interface, a SIM reset interface, and a SIM clock interface; and the memory card module includes at least a memory card first data interface, a memory card second data interface, and a memory card clock interface; where a position of the SIM data interface corresponds to that of the memory card first data interface; a position of the SIM reset interface corresponds to that of the memory card second data interface; and a position of the SIM clock interface corresponds to that of the memory card clock interface.

Figure 5:
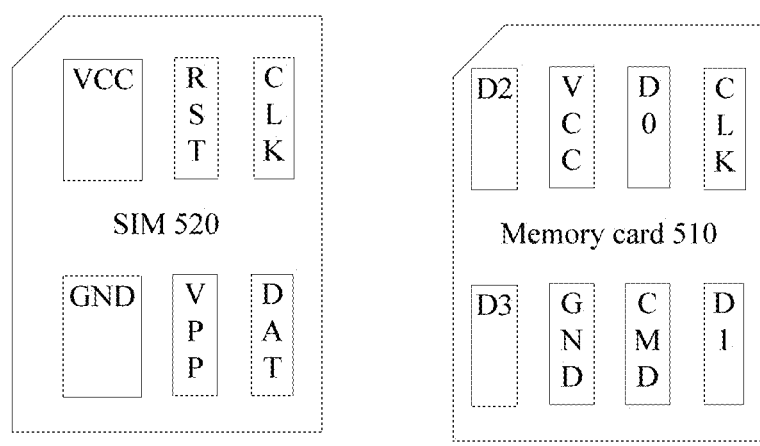
FIG. 5 is a schematic structural diagram of another memory card according to an embodiment of the present invention.

For example, with reference to FIG. 5, interfaces of the memory card 510 include: a data interface, a CMD interface, a ground interface, a power interface, a CLK interface, a DAT0 interface, a DAT1 interface, and a DAT2 interface. Corresponding interfaces of a nano SIM 520 include: a VPP interface corresponding to the CMD interface of the memory card 510, a ground interface corresponding to the ground interface of the memory card 510, a power interface corresponding to the power interface of the memory card 510, a CLK interface corresponding to the CLK interface of the memory card 510, a reset interface corresponding to the DAT0 interface of the memory card 510, and a data interface corresponding to the DAT1 interface.

Figure 6:
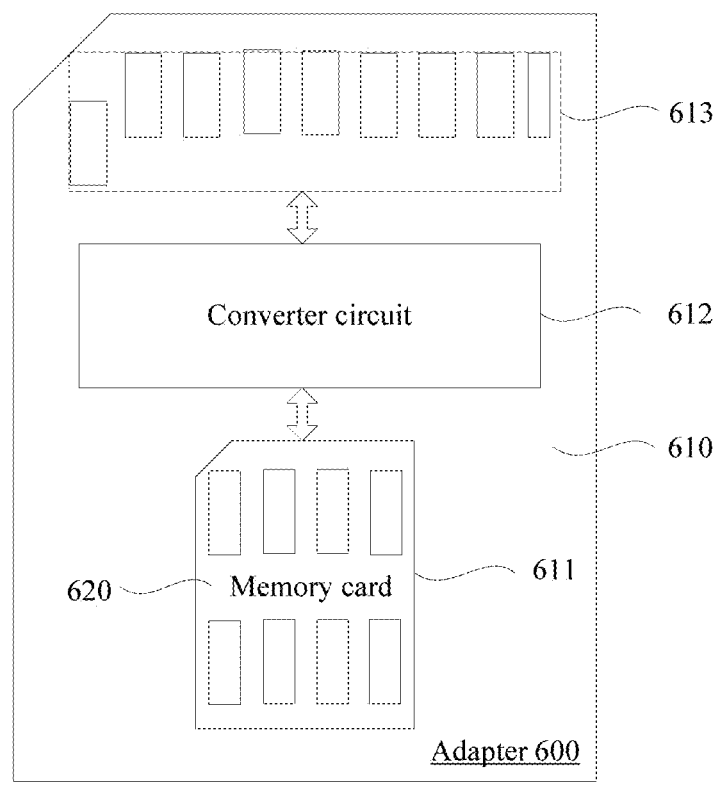
FIG. 6 is a schematic structural diagram of a memory card adapter according to an embodiment of the present invention.

FIG. 6 is a schematic structural diagram of a memory card adapter according to an embodiment of this application. As shown in FIG. 6, the memory card adapter 600 may include:

a housing portion 610 corresponding to a memory card socket of a first standard, where the housing portion 610 includes:

a card socket 611, where the card socket 611 is configured for placing a memory card 620 of a second standard, an outline and a size of the memory card of the second standard are the same as those of a nano SIM, and at least one interface position of the memory card of the second standard corresponds to an interface position of the nano SIM; and for specific implementation of the memory card 620, reference may be made to the embodiments shown in FIG. 4 and FIG. 5, without details described herein again; and a converter circuit 612, configured to perform conversion between an operating level for an interface of a memory card of the first standard and that for the interface of the second standard, during communication. In other words, the memory card adapter can convert the interface of the memory card 620 of the second standard to the interface of the memory card of the first standard by using the converter circuit 612.

Figure 7:
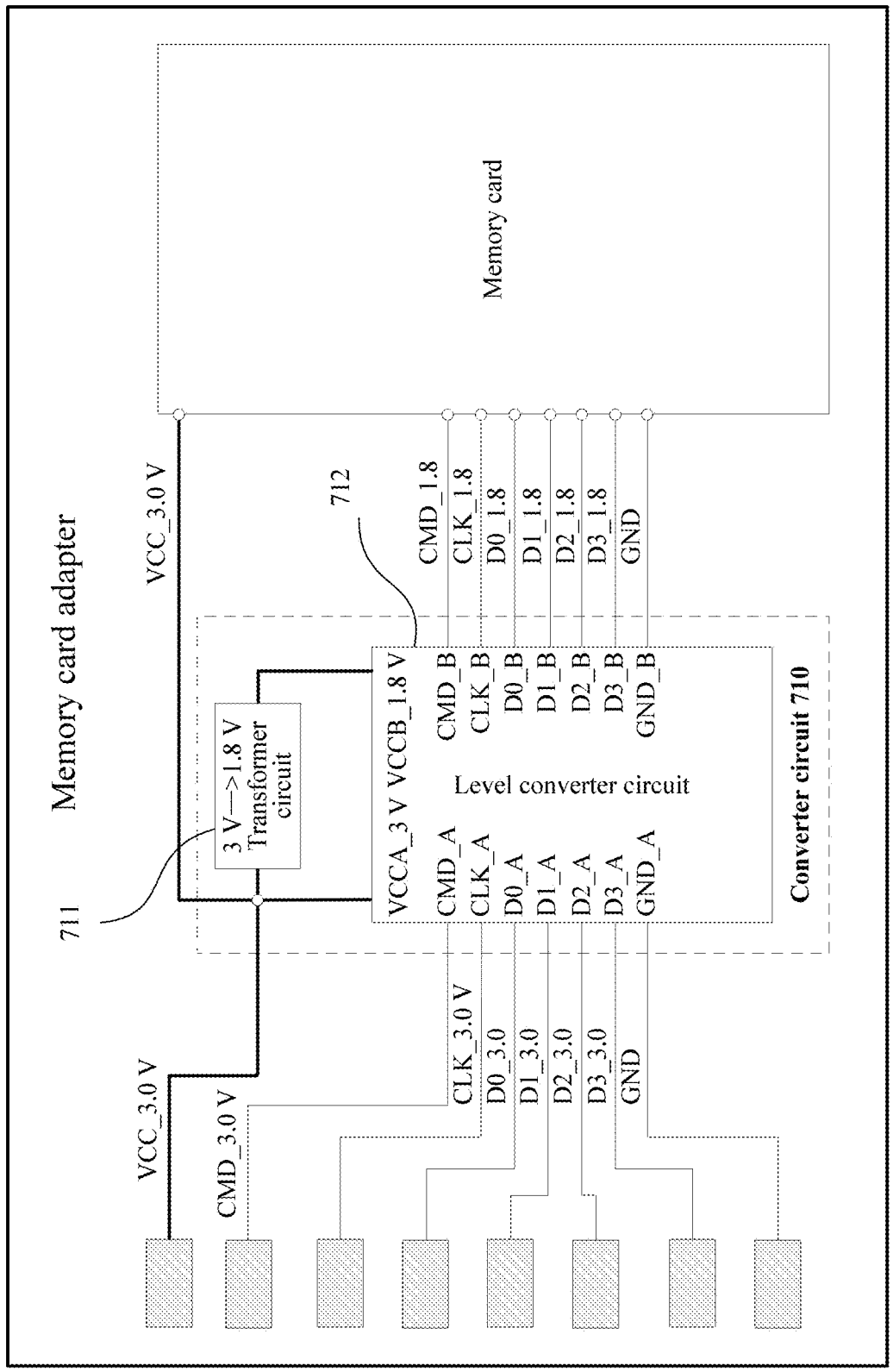
FIG. 7 is a schematic structural diagram of another memory card adapter according to an embodiment of the present invention.

An example is used in which the first standard is a standard for an SD card with an operating level of 3 V and that the second standard is a standard for a memory card having the same shape as a nano SIM with an operating level of 1.8 V. A memory card having a same shape as a nano SIM with an operating level of 1.8 V can be converted to an SD card with an operating level of 3 V by using a simple card socket and converter circuit. A memory card having the same shape as a nano SIM is 9 mm×12 mm in size, and an SD card is 24 mm×32 mm in size. Therefore, with a nano SD card placed in the housing corresponding to an SD card, the remaining space is enough to implement a 1.8V-to-3V converter circuit. Based on this, in an example of this embodiment of this application, the memory card of the first standard has a different operating level from the memory card of the second standard. In this case, the converter circuit needs to perform conversion between an operating level for the interface of the memory card of the first standard and that for the interface of the second standard, during communication. As shown in FIG. 7, a converter circuit 710 includes a level converter circuit 712 and a transformer circuit 711, where the level converter circuit 712 is configured to perform conversion between an operating level for an interface of a memory card of a first standard and that for an interface of a memory card of a second standard, and the transformer circuit 711 is configured to power the level converter circuit.

Figure 8:
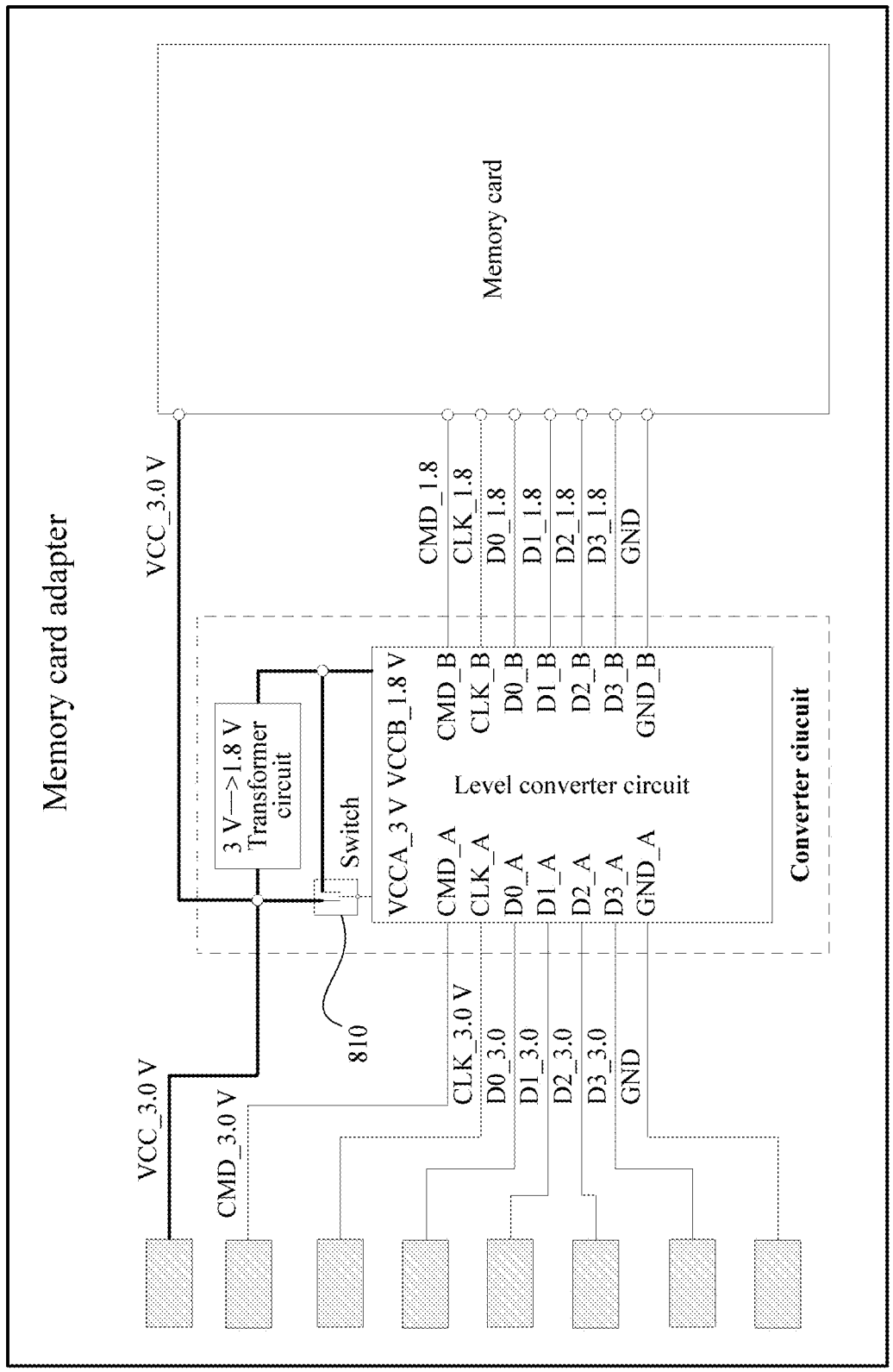
FIG. 8 is a schematic structural diagram of a memory card adapter according to an embodiment of the present invention.

In addition, SD cards are available in a plurality of operating level versions. In order to make an adapter compatible with these versions, a mechanical switch can be used to control an operating level of the memory card adapter. Based on this, in one embodiment of this application, the memory card of the first standard includes a plurality of operating levels, and the memory card adapter further includes a switch, where the switch is configured to control the operating level of the memory card adapter. For example, as shown in FIG. 8, a switch 810 may be placed between a converter circuit and a memory card interface of a first standard in a housing portion. In this way, the switch 810 can control the converter circuit to approach an operating level for the interface of the memory card of the first standard. For example, the switch may be set with a 1.8 V gear and a 3 V gear. For an SD card with an operating level of 3 V, the switch may be controlled to shift to the 3 V gear to supply power, and a power supply voltage provided to the converter circuit is 3 V. For an SD card with an operating level of 1.8 V, the switch may be controlled to shift to the 1.8 V gear to supply power, and a power supply voltage provided to the converter circuit is 1.8 V. In this solution, when a switch position does not match an actual operating level, powering with a lower voltage does not cause damage to a memory card interface of the second standard or a memory card interface of the first standard.

Figure 9:
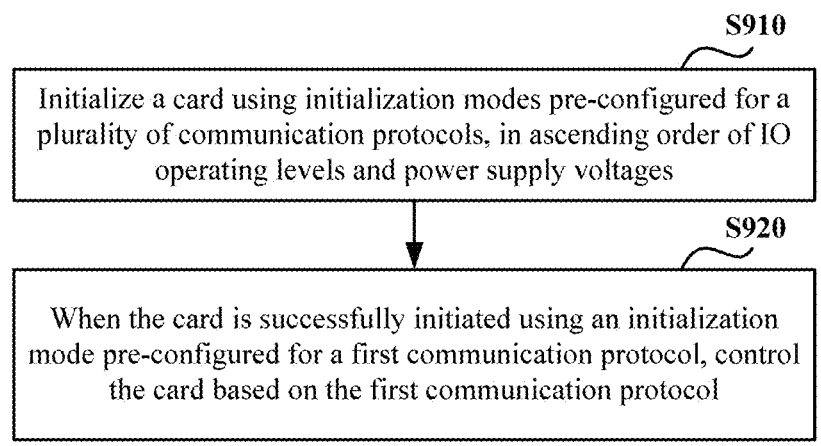
FIG. 9 is a schematic flowchart of a card recognition method according to an embodiment of this application.

FIG. 9 is a schematic flowchart of a card recognition method according to an embodiment of this application. As shown in FIG. 9, initialization modes are pre-configured for a plurality of communication protocols. The method may be a specific implementation that, when there is a card placed in a terminal device, a control circuit sends a first command to the card, and a detection circuit detects, based on a response of the card to the first command, that the card is a memory card or a SIM. In particular, the method includes the following steps.

S910. Initialize the card using the initialization modes pre-configured for the plurality of communication protocols, in ascending order of IO operating levels and power supply voltages. The first command may be an initialization command.

Communication protocols in this application include one or more of the following:

a SIM communication protocol with an IO operating level and a power supply voltage both being 1.8 V, a memory card communication protocol with an IO operating level of 1.8 V and a power supply voltage of 3 V, a memory card communication protocol with an IO operating level and a power supply voltage both being 3 V, and a SIM communication protocol with an IO operating level and a power supply voltage both being 3 V.

For example, IO operating levels and power supply voltages of the standard SIM, SD, and EMMC are described in Table 3 below.

TABLE 3

| | IO level | Power supply voltage of a card power source |
|---|---|---|
| SIM | 1.8 V | 1.8 V |
| | 1 3 V | 3 V |
| EMMC card | 1.8 V | 3 V |
| SD card | 1.8 V | 3 V |
| | 3 V | 3 V |

In addition, the SD card or the EMMC card is initialized using an SPI mode, with a CLK frequency of 100 kHz to 400 kHz, whereas a communication rate of the SIM is 1 MHz to 5 MHz. Besides, because different interfaces are used, they do not respond to initialization of the other. Therefore, through traversal of initialization processes, the card can be recognized as a SIM or a memory card, and even as a memory card of a specific protocol. Whether SIM initialization is performed before memory card initialization or otherwise, is determined based on to actual needs. A basic principle for recognition of and power supply for various cards is that, a card of a first level or voltage specification is not allowed to have a higher level of voltage, lest there is a risk of burnout of the card. Therefore, initialization performed in ascending order of IO operating levels and power supply voltages can reduce a probability of card burnout.

In this embodiment of this application, the memory card is not limited to using the SD or EMMC protocol. Memory cards of other communication protocols like USB, UFS, or PCIE are also appropriate.

S920. When the card is successfully initiated using an initialization mode pre-configured for a first communication protocol, control the card based on the first communication protocol.

Figure 10:
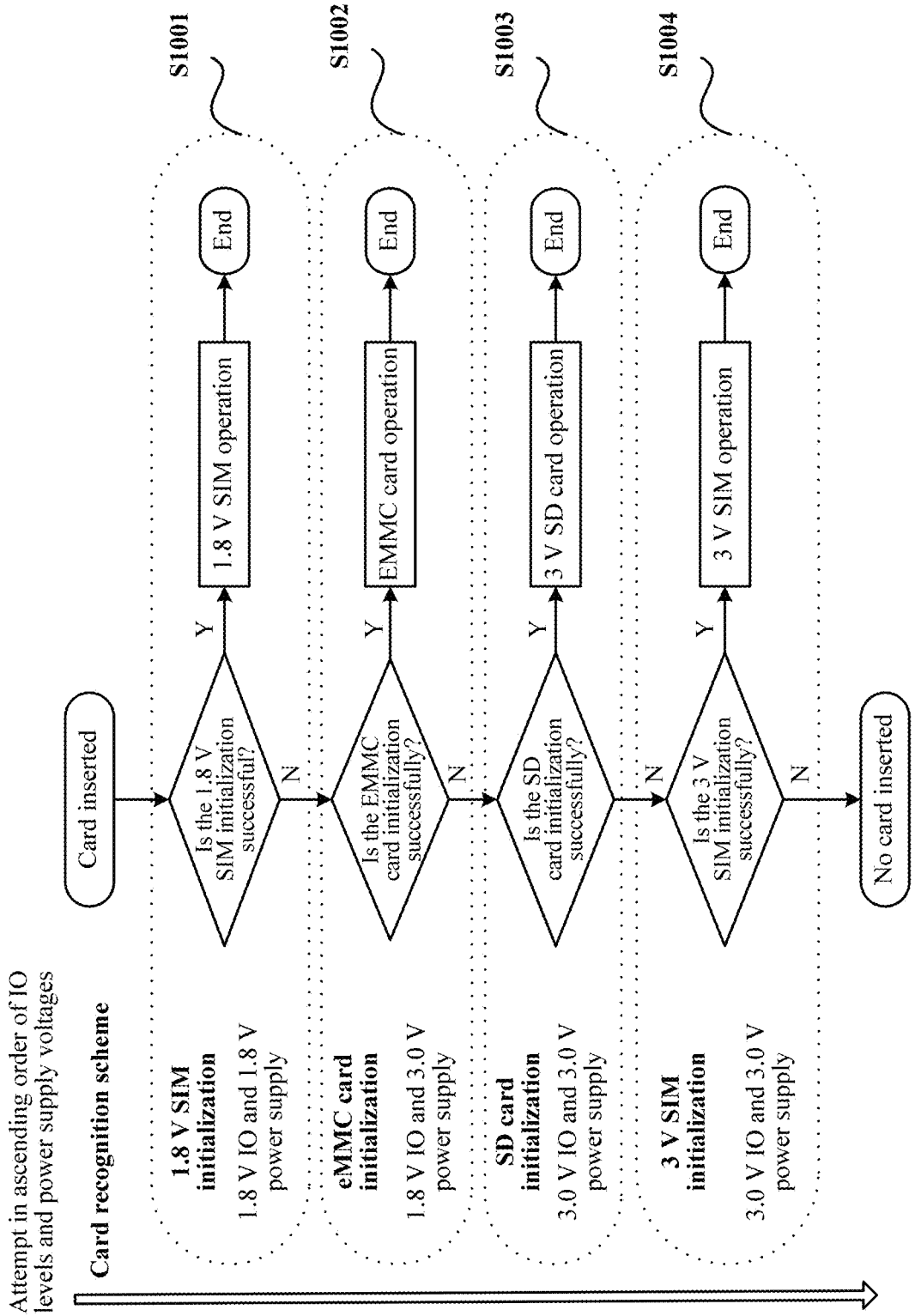
FIG. 10 is a schematic flowchart of another card recognition method according to an embodiment of this application.

For example, with reference to FIG. 10, the initialization modes for pre-configured communication protocols include: 1.8 V SIM initialization (an IO operating level of 1.8 V, and a power supply voltage of 1.8 V), eMMC card initialization (an IO operating level of 1.8 V, and a power supply voltage of 3 V), SD card initialization (an IO operating level of 3 V, and a power supply voltage of 3 V), and 3 V SIM initialization (an IO operating level of 3 V, and a power supply voltage of 3 V). In particular, the method includes the following steps:

S1001. Perform a 1.8 V SIM initialization process, and if this is successful, end the initialization, and control the card as a 1.8 V SIM.

S1002. Following S1001, if the 1.8 V SIM initialization is unsuccessful, perform an eMMC card initialization process, and if this is successful, end the initialization, and control the card as an eMMC card.

S1003. Following S1002, if the eMMC card initialization is unsuccessful, perform an SD card initialization process, and if this is successful, end the initialization, and control the card as an SD card.

S1004. Following S1003, if the eMMC card initialization is unsuccessful, perform a 3 V SIM initialization process, and if this is successful, end the initialization, and control the card as a 3 V SIM.

Figure 11:
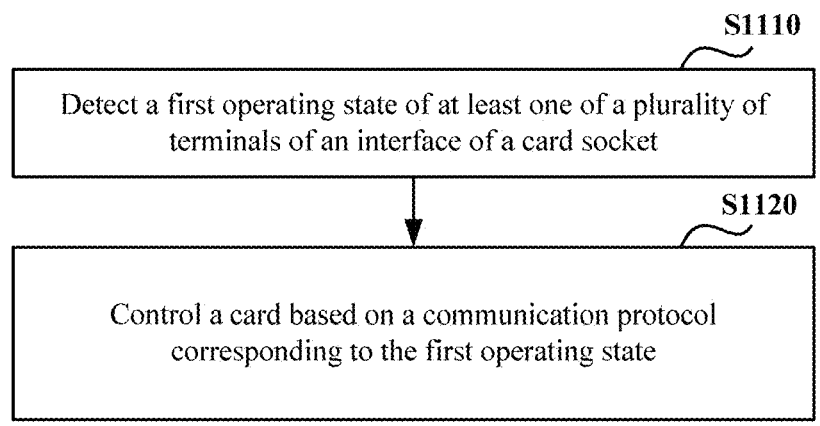
FIG. 11 is a schematic flowchart of another card recognition method according to an embodiment of this application.

FIG. 11 is a schematic flowchart of another card recognition method according to an embodiment of this application. As shown in FIG. 11, the method is applicable to a terminal device. The terminal device includes a card socket, and the card socket includes an interface, where the interface includes a plurality of terminals. For example, the terminal device may be the terminal device shown in FIG. 1 or FIG. 2. The method may be a specific implementation that, when there is a card placed in the terminal device, a control circuit sends a first command to the card, and a detection circuit detects, based on a response of the card to the first command, that the card is a memory card or a SIM. In particular, the method includes the following steps.

S1110. Detect a first operating state of at least one of the plurality of terminals of the interface of the card socket, where operating states of the at least one of the plurality of terminals of the interface are in a correspondence with communication protocols. The first command may be a command to detect operating states of the terminals of the interface of the card socket.

This embodiment of this application is applicable to all cards that have a same outline and a same size, but different quantities of interfaces. After different cards are inserted in the card socket, types of the cards are recognized based on whether different terminals of the card socket are shorted.

For example, with reference to the terminal device shown in FIG. 1 or FIG. 2, the plurality of terminals of the interface of the terminal device include at least one terminal that is configured to connect only to an interface of a memory card. Therefore, the type of the card can be determined based on the operating state of the at least one terminal.

In particular, operating states of the at least one of the plurality of terminals of the interface are in a correspondence with communication protocols, and the correspondence includes:

that the terminal configured to connect only to a memory card, when in a communicated state, corresponds to a memory card communication protocol; and that the terminal configured to connect only to a memory card, when in a shorted state, corresponds to a SIM communication protocol.

The memory card communication protocol includes micro SD card communication protocol, and the SIM communication protocol includes a nano SIM communication protocol.

S1120. Control the card based on a communication protocol corresponding to the first operating state.

Figure 12:
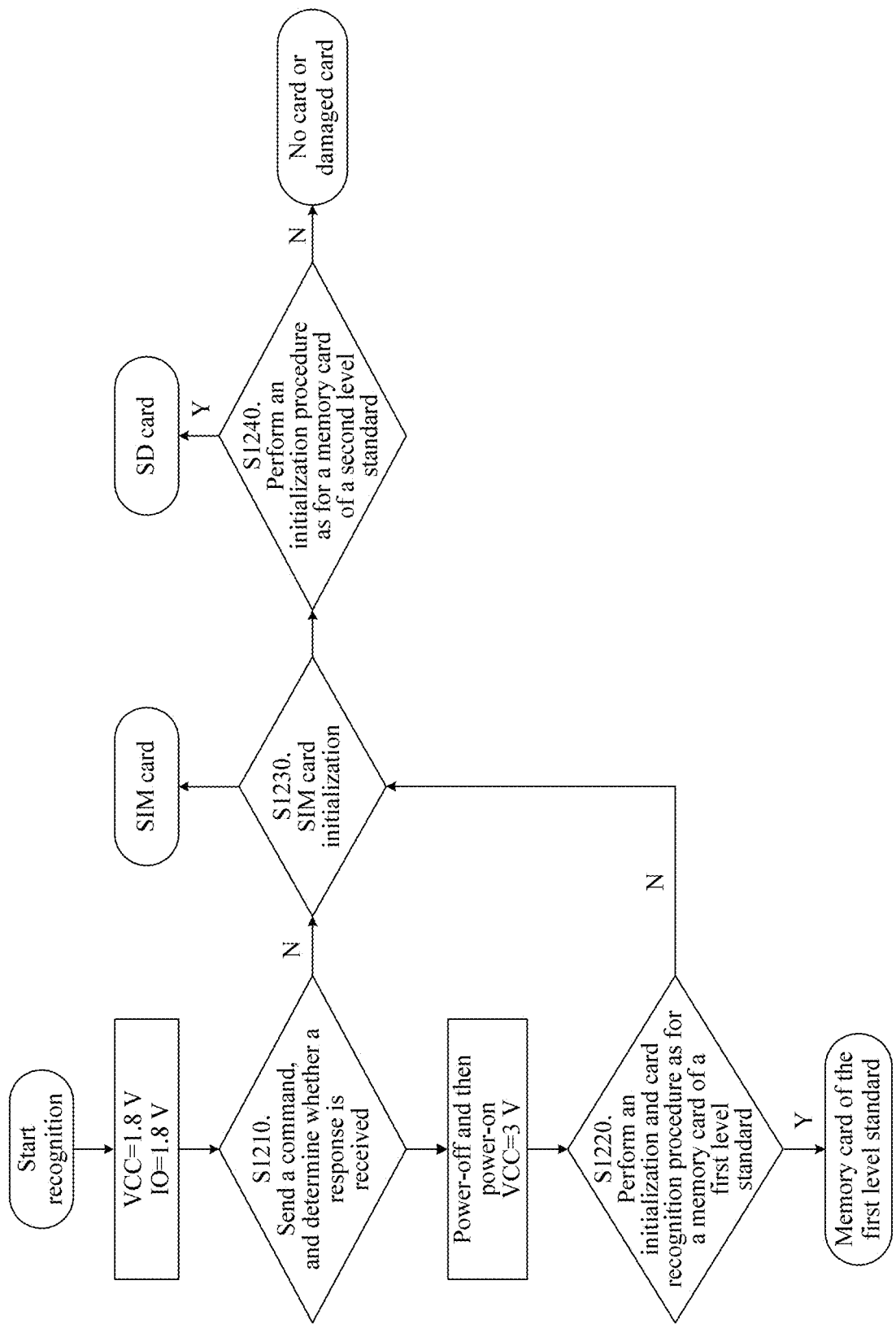
FIG. 12 is a schematic flowchart of another card recognition method according to an embodiment of this application.

FIG. 12 is a schematic flowchart of another card recognition method according to an embodiment of this application. As shown in FIG. 12, the method is applicable to a terminal device, for example, the terminal device shown in FIG. 1 or FIG. 2. The method may be a specific implementation that, when there is a card placed in the terminal device, a control circuit sends a first command to the card, and a detection circuit detects, based on a response of the card to the first command, that the card is a memory card or a SIM. In particular, the method includes the following steps.

S1210. Send a command to the card using a first voltage.

Herein, second voltage and first voltage are relative concepts. Generally, for a card, a second voltage is typically 3 V, and a first voltage is typically 1.8 V.

Figure 13:
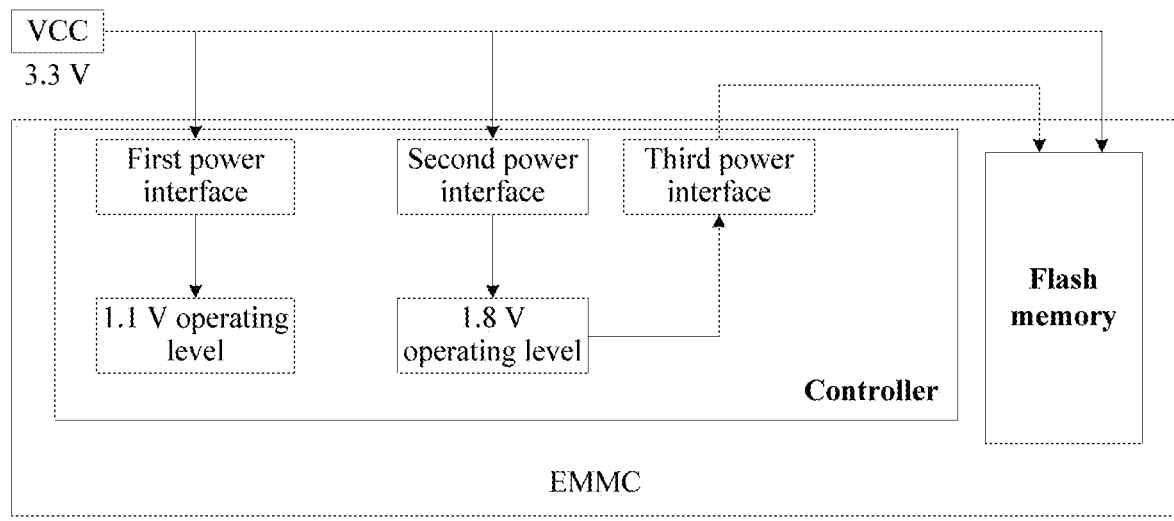
FIG. 13 is a schematic diagram of another memory card interface according to an embodiment of this application.

It can be learned with reference to FIG. 13, a memory card includes two parts: a controller and a flash memory, where only the flash memory needs to operate at a power voltage greater than 1.8 V, and the controller can operate at a power voltage as low as 1.8 V. Therefore, when a power interface is only supplied with a 1.8 V power voltage, a command may be sent to the memory card, and the memory card can process the command and return a response.

Therefore, the power interface and IO interface of the card may be supplied with the first voltage, and the command may be sent to the card.

If no response sent by the card is received, S1230 is performed.

S1220. If a response sent by the card is received, initialize the card as a memory card.

Memory card operating levels include a second level and a first level, the first level lower than the second level. Therefore, the card may be first initialized as a memory card of a first level standard. For example, a memory card of the first level standard may be an EMMC card, and a memory card of a second level standard may be an SD card. Based on this, if the card is successfully initialized as a memory card of the first level standard, the card is controlled as a memory card of the first level standard.

If the card is unsuccessfully initialized as a memory card of the first level standard, S1230 is performed.

S1230. Initialize the card as a SIM.

If the initialization is successful, the card is controlled as a SIM.

S1240. If the card is unsuccessfully initialized as a SIM, initialize the card as a memory card of the second level standard.

If the initialization is successful, the card is controlled as a memory card of the second level standard.

If the initialization is unsuccessful, it is determined that the card is damaged, or no card has been inserted yet.

Figure 14:
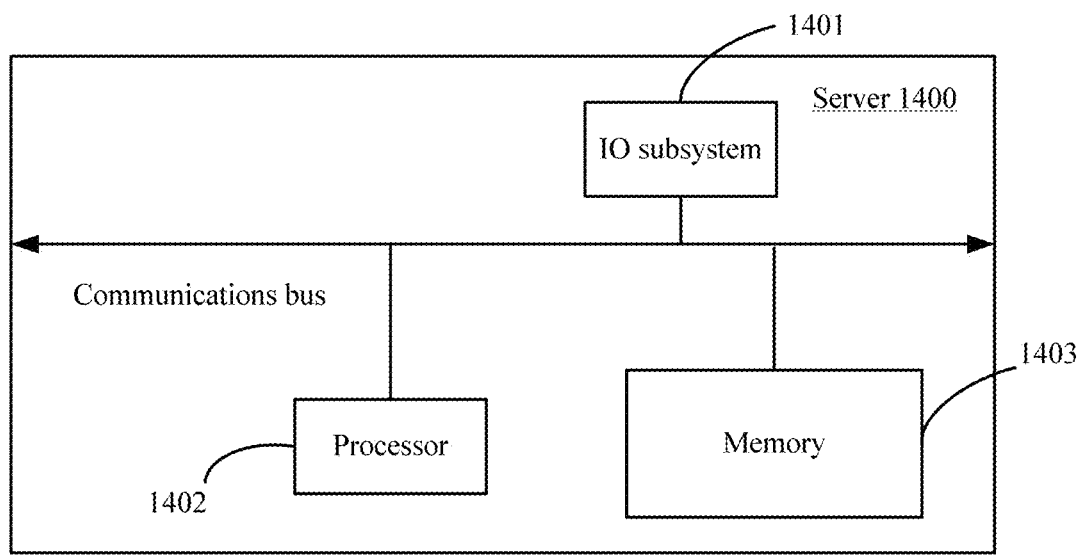
FIG. 14 is a schematic structural diagram of a terminal device according to an embodiment of the present invention.

FIG. 14 is a schematic structural diagram of another terminal device according to an embodiment of the present invention. As shown in FIG. 14, the terminal device 1400 specifically includes: an IO subsystem 1401, a processor 1402, and a memory 1403. The modules may be connected using a bus.

Reference may be made to the embodiments shown in FIG. 1 and FIG. 2 for information about the IO subsystem 1401. The processor 1402 may control the terminal device to perform the processing procedures related to the terminal device in FIG. 9 or FIG. 12, and/or be used for other procedures of the technology described in this application. The memory 1403 is configured to store program code and data of the terminal device.

All or some of the foregoing embodiments of the present invention may be implemented using software, hardware, firmware, or any combination thereof. When software is used for implementation, the embodiments may be implemented fully or partially in a form of a computer program product. The computer program product includes one or more computer instructions. When the computer program instructions are loaded and executed on a computer, the procedure or functions according to the embodiments of the present invention are fully or partially generated. The computer may be a general-purpose computer, a dedicated computer, a computer network, or other programmable apparatuses. The computer instructions may be stored in a computer readable storage medium or may be transmitted from a computer readable storage medium to another computer readable storage medium. For example, the computer instructions may be transmitted from a website, computer, server, or data center to another website, computer, server, or data center in a wired (for example, a coaxial cable, an optical fiber, or a digital subscriber line (Digital Subscriber Line, DSL)) or wireless (for example, infrared, radio, or microwave) manner. The computer readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid state disk (Solid State Disk, SSD)), or the like.

The foregoing descriptions are merely specific implementations of the present invention, but are not intended to limit the protection scope of the present invention. Any variation or replacement readily figured out by persons skilled in the art within the technical scope disclosed in the present invention shall fall within the protection scope of the present invention. Therefore, the protection scope of the present invention shall be subject to the protection scope of the claims.

What is claimed is:

1. A terminal device, wherein the terminal device comprises:
    a card socket configured to receive a subscriber identification module (SIM) card or a memory card;
    a SIM electrical component comprising a SIM data interface, a SIM reset interface, and a SIM clock interface;
    a memory card electrical component comprising a memory card first data interface, a memory card second data interface, and a memory card clock interface;
    a first switch configured to electrically couple the SIM data interface to a data interface of the SIM card in response to the SIM card being placed in the card socket;
    a second switch configured to electrically couple the SIM reset interface to a reset interface of the SIM card in response to the SIM card being placed in the card socket; and
    a third switch configured to electrically couple the SIM clock interface to a clock interface of the SIM card in response to the SIM card being placed in the card socket.

2. The terminal device of claim 1, wherein the first switch is further configured to electrically couple a second data interface of the memory card to the memory card second data interface in response to the memory card being placed in the card socket, wherein the second switch is further configured to electrically couple a first data interface of the memory card to the memory card first data interface in response to the memory card being placed in the card socket, and wherein the third switch is further configured to electrically couple a clock interface of the memory card to the memory card clock interface in response to the memory card being placed in the card socket.

3. The terminal device of claim 1, wherein a shape of the memory card is the same as a shape of the SIM card.

4. The terminal device of claim 1, wherein a size of the memory card is the same as a size of the SIM card.

5. The terminal device of claim 1, wherein the SIM card is a nano SIM card.

6. The terminal device of claim 1, further comprising a detector coupled to the card socket and configured to detect that a first card placed in the card socket is the SIM card or the memory card.

7. The terminal device of claim 6, further comprising a controller coupled to the card socket and configured to send a first command to the first card, and wherein the detector is further configured to further detect, based on a response from the first card, that the first card is the SIM card.

8. The terminal device of claim 6, further comprising a controller coupled to the card socket and configured to send a first command to the first card, and wherein the detector is further configured to further detect, based on a response from the first card, that the first card is the memory card.

9. The terminal device of claim 1, further comprising a power source coupled to the card socket, wherein a voltage of the power source is configured to be:
    set to a first voltage when a card is placed in the card socket; and
    set to a second voltage when the card is unsuccessfully initialized after the voltage of the power source is set to the first voltage.

10. The terminal device of claim 9, wherein the first voltage corresponds to the SIM card.

11. A terminal device, wherein the terminal device comprises:
    a card socket configured to receive a subscriber identification module (SIM) card or a memory card;
    a SIM electrical component comprising a SIM data interface, a SIM reset interface, and a SIM clock interface;
    a memory card electrical component comprising a memory card first data interface, a memory card second data interface, and a memory card clock interface;
    a first switch, a second switch, and a third switch;
    a processor; and
    a memory storing one or more programs that, when executed by the processor, cause the terminal device to:
        electrically couple the SIM data interface to a data interface of the SIM card via the first switch in response to the SIM card being placed in the card socket;
        electrically couple the SIM reset interface to a reset interface of the SIM card via a second switch in response to the SIM card being placed in the card socket; and
        electrically couple the SIM clock interface to a clock interface of the SIM card via a third switch in response to the SIM card being placed in the card socket.

12. The terminal device of claim 11, wherein the one or more programs further cause the terminal device to:
    electrically couple a second data interface of the memory card to the memory card second data interface via the first switch in response to the memory card being placed in the card socket;
    electrically couple a first data interface of the memory card to the memory card first data interface via the second switch in response to the memory card being placed in the card socket; and electrically couple a clock interface of the memory card to the memory card clock interface via the third switch in response to the memory card being placed in the card socket.

13. The terminal device of claim 11, further comprising a power source coupled to the card socket, wherein the one or more programs further cause the terminal device to:
set a voltage of the power source to a first voltage when the first card is placed in the card socket; and
set a voltage of the power source to a second voltage when the card is unsuccessfully initialized after the voltage of the power source is set to the first voltage.

14. The terminal device of claim 13, wherein the first voltage corresponds to the SIM card.

* * * * *